Aug. 14, 1928.
J. HOPKINSON
1,680,683
WEIGHING SCALE
Filed March 19, 1926    3 Sheets-Sheet 1
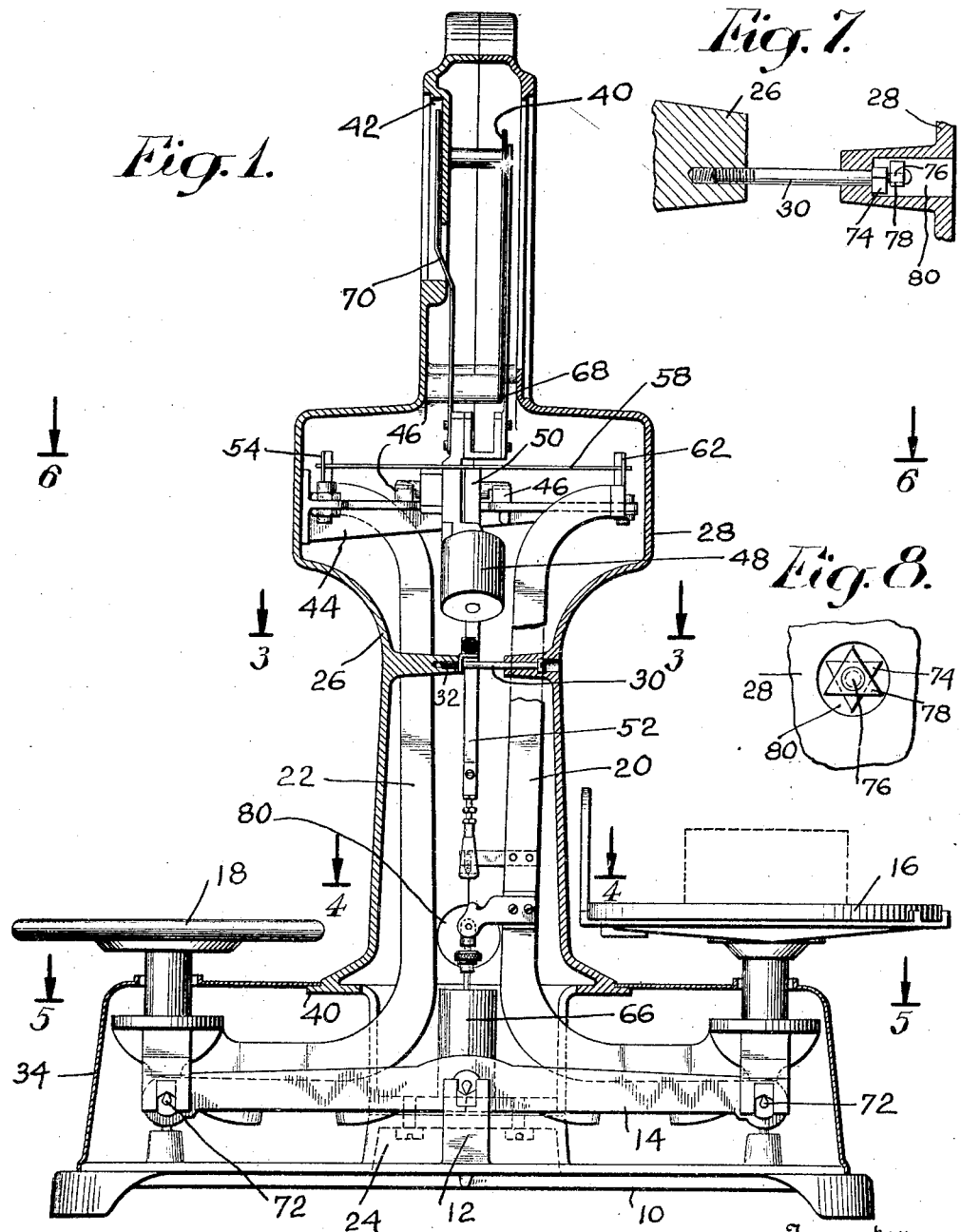

Aug. 14, 1928.
J. HOPKINSON
1,680,683
WEIGHING SCALE
Filed March 19, 1926  3 Sheets-Sheet 2
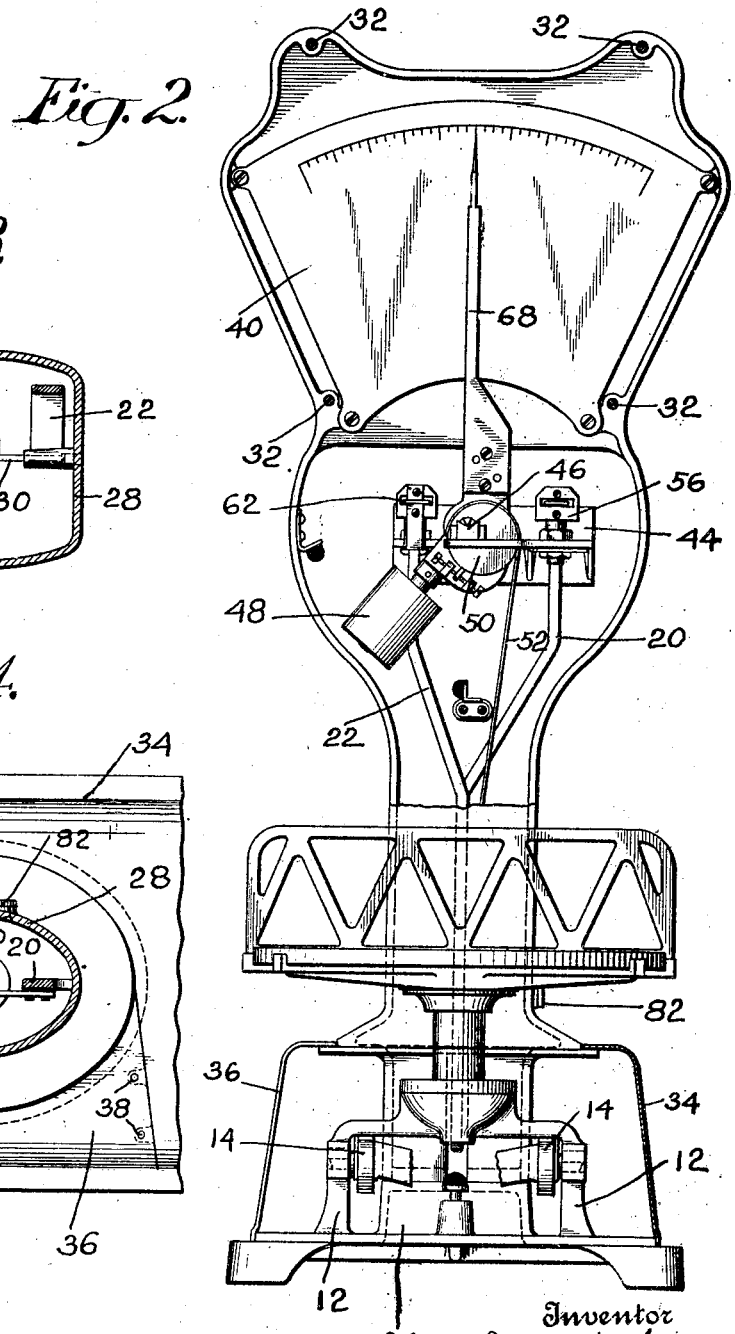

Aug. 14, 1928.

J. HOPKINSON 1,680,683

WEIGHING SCALE

Filed March 19, 1926  3 Sheets-Sheet 3

Inventor
Joseph Hopkinson
By his Attorneys
Cooper, Kerr + Dunham

Patented Aug. 14, 1928.

1,680,683

UNITED STATES PATENT OFFICE.

JOSEPH HOPKINSON, OF DAYTON, OHIO, ASSIGNOR TO DAYTON SCALE COMPANY, OF DAYTON, OHIO, A CORPORATION OF NEW JERSEY.

WEIGHING SCALE.

Application filed March 19, 1926, Serial No. 95,816, and in Great Britain December 23, 1925.

This invention pertains to even balance self-indicating weighing scales of the general type disclosed in the specification of my Patent No. 817,777, issued April 17, 1906, and has for its principal object the design of a scale of that type which may be used across the counter instead of lengthwise thereof.

Attempts have been made to design a scale of that description but they have not been entirely successful, principally on account of the difficulty of securing sufficient vertical length of the check members and still provide sufficient horizontal space for the check stays which join the upper ends of the check members to the frame of the machine.

It will be understood that the check stays must be half the length of the main scale beam or lever, and that they must extend in the same direction as the main lever, which in the "cross counter" scale here considered, is at right angles to the indicating chart.

For accuracy of performance the check members should be as long as possible. In the design disclosed in the above patent it was an easy matter to make them long because the chart was parallel to the check stays and the stays could therefore be accommodated in that part of the scale housing which enclosed the chart. However when the chart was turned to a position at right angles to the scale beam it is no longer possible to place the upper ends of the check members at the same height as the chart because the check stays would have to pass through the chart instead of being parallel to it.

This has forced the shortening of the check members, and cross counter scales have been designed in which ends of the check members are placed in an enlargement of the scale housing above the scale platforms but below the chamber enclosing the pendulum. Such a design has many objections, some of which are—the check members are very short being less than half their former length; the check stay housing being close above the goods platform or pan and projecting over it often interferes with the proper weighing of the goods; also it is difficult to get access to the working parts of the scale, the pendulum being in one portion of the housing and the check stays in another, and the chart in still another.

Some of the objects of the present invention are to provide check members of as great vertical length as possible underneath the chart, to have all projections of the scale housing sufficiently above the goods platform to not interfere with weighing operation, to assemble in one unit the pendulum and upper check mechanisms at substantially the same level immediately below the chart, and to design the scale housing so that all working parts will be fully enclosed while in operation yet easily accessible for adjustment or repairs.

The present invention comprises a weighing scale of the type described above in which the chart is at right angles to the beam; the base is enclosed by a removable casing, and the upright housing is split vertically, one half being removable to give access to the mechanism. Immediately below the chart the housing is enlarged in both directions to accommodate the pendulum, check stays, and upper ends of check members. In this enlarged chamber is a shelf-like bracket either integral with or bolted to the non-removable half of the upright housing and on this bracket are mounted the pendulum bearings and the fixed stems to which the check stays are anchored. The check stays are level with or may even be above the pendulum bearings. The check members extend upwardly from the base of the scale and have the same general shape as in the scale in above mentioned patent, except that the upper ends of the check members are offset sidewise to right and left so that one may pass on each side of the pendulum mechanism and not interfere therewith.

No working parts are attached to the removable portions of the base cover or upright housing. Therefore all movable parts of the mechanism are accessible while they are in normal operating position.

The removable portions of the scale housing or casing are secured in position by an improved fastening device which prevents its operation by unauthorized persons.

In the drawings;

Fig. 1 is a side view of the scale mechanism, the enclosing casings being in section.

Fig. 2 is a front view of the mechanism, the base casing being in section and the removable portion of the upright housing being partly broken away.

Fig. 3 is a section on line 3—3 of Fig. 1.

Figure 5:
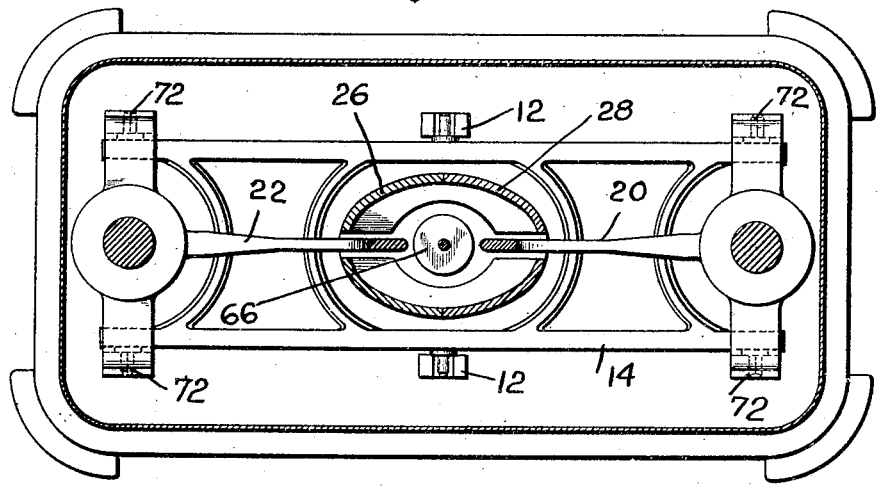
Figure 6:
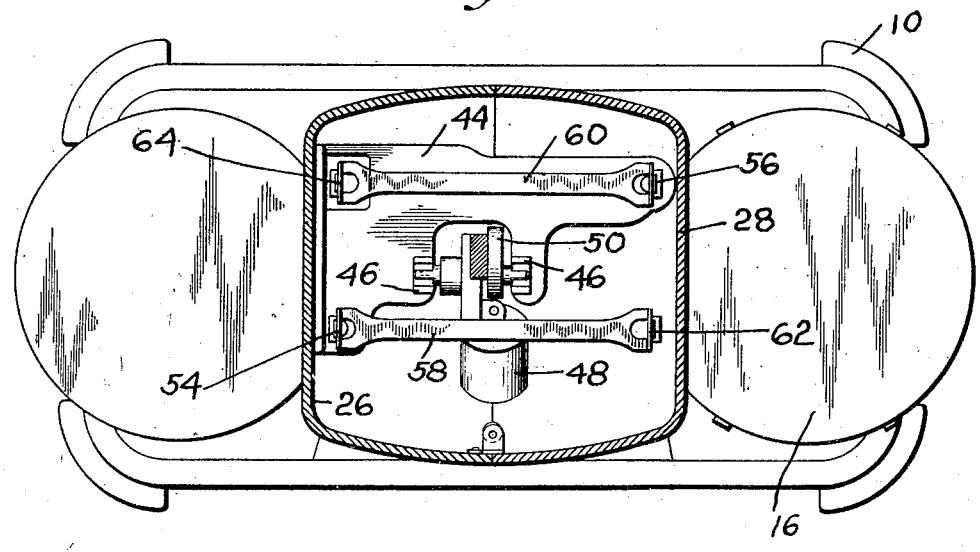

Fig. 4 is a section on line 4—4 of Fig. 1.
Fig. 5 is a section on line 5—5 of Fig. 1.
Fig. 6 is a section on line 6—6 of Fig. 1.
Fig. 7 is a detail view of the means for locking the two halves of the housing together.
Fig. 8 is another view of Fig. 7.

The scale base 10 has at its center the fulcrum pillars 12 on which is pivoted the even balance lever 14 which carries on pivots 72 at its two ends the goods pan 16 and the weight pan 18. Rigidly connected to the goods pan and weight pan are the check members 20 and 22 respectively, extending upwardly inside the vertical housing of the scale, all in the manner well known in scales of this type. The central portion of base 10 between fulcrums 12 is raised as at 24 and on the raised portion are mounted the two halves of the vertical housing which supports and encloses the upper scale mechanism. This vertical housing comprises a main portion 26 and a cover portion 28. To the main portion 26 are secured supports for all working parts of the machine aside from those within the base, while cover portion 28 acts simply as an enclosing casing having no working parts fastened to it. Cover 28 is secured to main vertical housing 26 by means of screw 30 (Fig. 1) and by other screws not shown, threaded into holes 32 (Fig. 2).

The base mechanism of the scale is enclosed by a casing comprising a major portion 34 and a minor portion 36, the two parts while in position being fastened together as by screws 38 so as to form a complete enclosure for the working parts mounted on the scale beam. The base casing fits snugly above the flange 40 of vertical housing 26 and its cover portion 28. The base enclosing casing may be removed from the scale by first removing the minor section 36 and pans 16 and 18, after which the major portion 34 of the casing may be taken off. Vertical housing cover 28 may be also removed, simply by withdrawing the screws which hold it to housing 26 and base 24. After the base casing and vertical cover 28 are removed the scale is still in working order with all working parts in normal position, but accessible for inspection or adjustment. Charts 40 and 42 are secured to housing 26 in its upper portion, the charts facing towards goods pan 16 and weight pan 18 respectively. Immediately below the chart enclosing portion of the vertical housing is a shelf-like bracket 44 (Figs. 1, 2 and 6) fast to housing 26. Mounted on bracket 44 are the bearings 46 in which rests the pivot of the usual pendulum 48, which is connected in the well known manner by cam 50 and tape 52 to check member 20. Also mounted on bracket 44 are check stems 54 and 56 connected by check stays 58 and 60 to the upper ends of check members 22 and 20 at points 62 and 64 respectively. It will be noted that this arrangement allows the check stays 58 and 60 to be at a higher level than the pendulum 48 and its bearings 46. 66 is the usual dash pot to check vibration. Indicators 68 and 70, secured to the pendulum structure, cooperate with charts 40 and 42 respectively, to indicate weights of goods on the goods pan 16. If desired, chart 40 may be graduated with computed values as well as weights, in which case indicator 68 will be of the well known type suitable for pointing out values as well as weights.

It will be noted that check members 20 and 22 are offset to right and left (Fig. 2) in order that their upper ends may provide space between them to accommodate the pendulum supporting mechanism. Attention is called to the fact that the upper ends of check members 20 and 22, although offset, do not project sidewise beyond pivots 72 which support the scale pans or platforms and which are rigidly connected to check members 20 and 22. So long as the offsets in the check members do not carry their upper bearings outside of pivots 72 the proper action of the check members will not be adversely affected.

In order to prevent unauthorized persons from tampering with the scale mechanism one or more of the casing locking screws is of such design as to require a special tool to remove it. I have shown such a device in connection with screw 30 (Figs. 7 and 8) which is one of the screws holding cover housing 28 to main housing 26.

The screw head 74 is of some shape unusual in screw heads, such, for instance, as a triangle. Projecting from the center of head 74 is a headed pin 76, on which is mounted for free rotation an auxiliary or imitation head 78 of the same shape as the real head 74. Screw head 74 and its companion head 78 are set deep in a counterbored hole 80 in casing 28. Any person authorized to remove screw 30 is provided with a special tool which will reach past the loose head 78 and properly engage real head 74, but if an unauthorized person tries to turn bolt 30 with, say a screw driver or similar tool, he will only be able to actuate the auxiliary head 78 which will turn idly, thus serving as a guard to protect the real bolt head 74 and thus prevent unauthorized tampering.

To provide access to dash pot 66 for adjustment purposes an opening 80 is provided (Fig. 1) part of which is in each half of the vertical housing. To keep the opening closed a plate 82 is provided pivotally supporting on casing 26 (Figs. 2 and 4).

What I claim is—

1. In an automatic scale, in combination, a lever pivoted intermediate its ends, platforms pivotally supported by said lever, check members extending upwardly from said platforms, check stays cooperating with the upper ends of said check members, a pendulum connected to one of said check members, and a chart at right angles to said lever, said chart being immediately above and said pendulum immediately below said check stays.

2. An even balance automatic scale comprising in combination a base, a lever pivotally mounted on said base, check members, check stems, check stays connecting said check members to said check stems, a pendulum, a chart at right angles to said lever, a casing, and a bracket fast to said casing immediately below said chart, said check stems being fast to and said pendulum being pivotally supported on said bracket.

3. The invention set forth in claim 2 in which said casing comprises a main casing which supports scale mechanism, and an auxiliary casing entirely independent of said mechanism, said auxiliary casing being removable to provide access to said mechanism while it is in normal operative position attached to said main casing.

4. A weighing scale of the automatic even balance type comprising load counterbalancing and check structure including check links, a base structure and a vertical structure supported thereon, said base structure supporting a lever, and said vertical structure comprising two housing parts one of which supports a chart at right angles to said lever, and also supports the load counterbalance means and all check parts, said check parts which are supported thereby including the check links which project toward the other vertical housing part and into a recess therein, portions of said base structure and the second mentioned housing portion of the vertical structure being removable to provide access to all working parts of the scale while they are in normal operative position.

5. In an automatic scale, in combination, an enclosing casing comprising a main portion and an auxiliary portion normally secured to said main portion by a screw having a stem and a fixed head of particular size and contour, said screw being provided with an auxiliary head of same size and contour as the fixed head and mounted for free rotation on a stem projecting axially from said fixed head, said heads while in normal position being in a countersink below the surface of said enclosing casing substantially as described.

6. In an even balance automatic scale, in combination, a main lever, a check system having check links, a pendulum, and a chart at right angles to said check stays, said chart being located above said check stays and said pendulum below said check stays.

In testimony whereof I hereto affix my signature.

JOSEPH HOPKINSON.